US009898957B2

(12) United States Patent
Lin (10) Patent No.: US 9,898,957 B2
(45) Date of Patent: Feb. 20, 2018

(54) DISPLAY DEVICE WITH SWITCHABLE VIEWING ANGLE AND OPERATION METHOD THEREOF

(71) Applicant: AU Optronics Corporation, Hsin-Chu (TW)

(72) Inventor: Hui-Feng Lin, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 15/165,281

(22) Filed: May 26, 2016

(65) Prior Publication Data

US 2017/0154563 A1 Jun. 1, 2017

(30) Foreign Application Priority Data

Nov. 30, 2015 (TW) .............................. 104139972 A (51) Int. Cl.
*G09G 3/20* (2006.01)
*G06F 3/01* (2006.01)
*G09G 3/36* (2006.01)

(52) U.S. Cl.
CPC ............. *G09G 3/2085* (2013.01); *G06F 3/01* (2013.01); *G09G 3/2096* (2013.01); *G09G 3/36* (2013.01); *G09G 2300/0439* (2013.01); *G09G 2320/068* (2013.01); *G09G 2354/00* (2013.01); *G09G 2358/00* (2013.01)

(58) Field of Classification Search
CPC ...... G09G 3/2085; G09G 3/2096; G09G 3/36; G09G 2300/0439; G09G 2320/068; G09G 2354/00; G09G 2358/00; G06F 3/01
USPC .......................................................... 345/90
See application file for complete search history.

(56) References Cited

U.S. PATENT DOCUMENTS

| 7,714,957 | B2 | 5/2010 | Momoi et al. |
| 8,698,989 | B2 | 4/2014 | Sugiura et al. |
| 2008/0055221 | A1* | 3/2008 | Yabuta ................ G02F 1/13338 345/90 |
| 2009/0310045 | A1 | 12/2009 | Park et al. |
| 2012/0280895 | A1* | 11/2012 | Yeh ....................... G02F 1/1323 345/87 |
| 2015/0181182 | A1 | 6/2015 | Lin et al. |
| 2015/0378433 | A1* | 12/2015 | Savastinuk ........ G06K 9/00255 345/156 |

FOREIGN PATENT DOCUMENTS

CN 103886852 6/2014

OTHER PUBLICATIONS

Taiwan Intellectual Property Office, "Office Action", dated Jul. 7, 2016.

* cited by examiner

*Primary Examiner* — Stephen Sherman
(74) *Attorney, Agent, or Firm* — WPAT, PC (57) ABSTRACT

A display device with switchable viewing angle includes a first pixel and a second pixel. The first pixel has a first sub-pixel and a second sub-pixel. The second pixel has a third sub-pixel, a fourth sub-pixel and a fifth sub-pixel. The fifth sub-pixel is configured to be enabled when operating in a narrow viewing angle mode and to be disabled when operating in a wide viewing angle mode. When the fifth sub-pixel is enabled, each viewing angle of the first sub-pixel, the second sub-pixel, the third sub-pixel and the fourth sub-pixel is narrower than that when the fifth sub-pixel is disabled.

18 Claims, 5 Drawing Sheets

DISPLAY DEVICE WITH SWITCHABLE VIEWING ANGLE AND OPERATION METHOD THEREOF

BACKGROUND

Technical Field

The present invention relates to a pixel structure of a display device, and in particular, to a pixel structure of a display device with switchable viewing angles.

Related Art

Along with popularization of portable electronic devices such as smart phones and tablet computers, people have more opportunities to use communication software, browse a web page, or process an e-mail while in public spaces, for example, in public transportation such as metro or bus, and in this case, picture information displayed on the electronic device may be viewed by a nearby passenger, and private information of a user such as personal information or a private password may be unwittingly compromised. To solve this problem, an optical privacy filter currently available in the market may protect data on a screen from being viewed by unauthorized individuals; however, it also has problems derived therefrom, such as reduction of the brightness at the front side of the screen and reduction of the sharpness of the display.

In addition to the optical privacy filter, researchers also developed a technology to prevent other persons from viewing content of a display by manipulating light emission angles of liquid crystals. In this method, briefly, a white sub-pixel is added in a single pixel in addition to sub-pixels of three-primary colors of red, green and blue. When a user enables a privacy filtering function, the white sub-pixel is turned on to reduce the visibility of the original sub-pixels of three-primary colors due to the light emission angle; however, when the privacy filtering function is disabled, the white sub-pixel is turned off to avoid color cast, oversaturation, or undersaturation et al.; in other words, merely the sub-pixels of three-primary colors in one pixel are used for light emission, and in this way, the aperture ratio of the screen is reduced. Further, in this method, a plurality of white sub-pixels in a display device is arranged in a regular manner, the light emission angles of interfering pixels may be overly restricted or other persons can view the displayed information on the screen by slightly changing the angles; therefore, there is a need for further improvement in its privacy filtering effect.

SUMMARY

The present invention provides a display device with switchable viewing angle, which can be used to solve the problems in the prior art.

The present invention further provides an operation method applicable to the display device with switchable viewing angle.

A display device with switchable viewing angle provided in the present invention includes a first pixel and a second pixel. The first pixel has a first sub-pixel and a second sub-pixel, and the second pixel has a third sub-pixel, a fourth sub-pixel and a fifth sub-pixel. The fifth sub-pixel is configured to be enabled under a narrow viewing angle mode and to be disabled under a wide viewing angle mode. When the fifth sub-pixel is enabled, each viewing angle of the first sub-pixel, the second sub-pixel, the third sub-pixel and the fourth sub-pixel is narrower than that when the fifth sub-pixel is disabled.

The present invention further provides an operation method of a display device with switchable viewing angle, and the operation method is applicable to a display device including a first pixel and a second pixel, the first pixel having a first sub-pixel and a second sub-pixel, the second pixel having a third sub-pixel, a fourth sub-pixel and a fifth sub-pixel, each area of the first sub-pixel, the second sub-pixel and the third sub-pixel being n times of the area of the fourth sub-pixel, and n being a positive number, the operation method includes the following steps: detecting a primary target and a secondary target; and if a secondary target is detected, enabling the display device to be executed in a narrow viewing angle mode, wherein, the fifth sub-pixel is enabled under the narrow viewing angle mode, and when the fifth sub-pixel is enabled, each viewing angle of the first sub-pixel, the second sub-pixel, the third sub-pixel and the fourth sub-pixel is narrower than that when the fifth sub-pixel is disabled.

In the display device of the present invention, the fourth sub-pixel and the fifth sub-pixel are configured in the second pixel, and therefore, when the fifth sub-pixel is enabled to emit light under the narrow viewing angle mode, lateral light emission of the fifth sub-pixel reduces viewing angles of the first sub-pixel, the second sub-pixel, the third sub-pixel and the fourth sub-pixel, and when the fifth sub-pixel is disabled from emitting light under the wide viewing angle mode, the viewing angles of the first sub-pixel, the second sub-pixel, the third sub-pixel and the fourth sub-pixel are kept unchanged, thereby achieving the effect of privacy filtering. Moreover, the display device may have a better aperture ratio in the narrow viewing angle mode.

DETAILED DESCRIPTION

Figure 1:
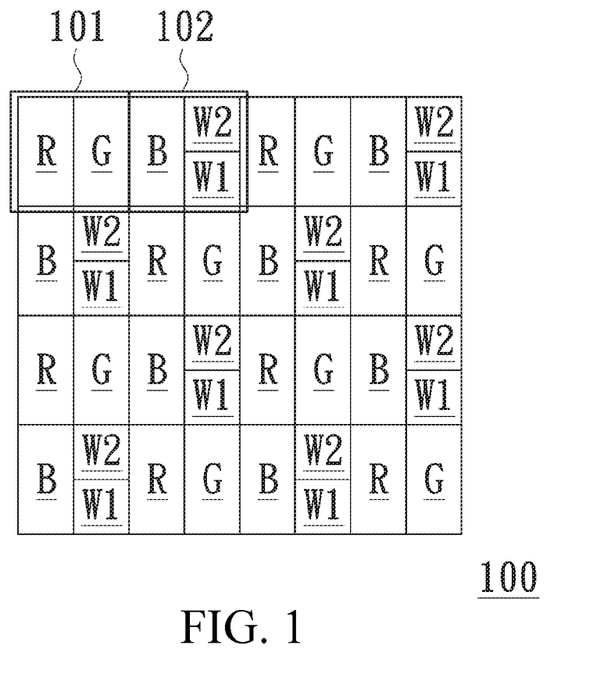
FIG. 1 is a schematic diagram of a display device with switchable viewing angle according to an embodiment of the present invention.

FIG. 1 is a schematic diagram of a display device with switchable viewing angle according to an embodiment of the present invention. As shown in FIG. 1, the display device 100 with switchable viewing angle includes a first pixel 101 and a second pixel 102. In this embodiment, the first pixel 101 includes a sub-pixel R and a sub-pixel G, and the second pixel 102 includes a sub-pixel B, a sub-pixel W1 and a sub-pixel W2. In this embodiment, the sub-pixel R, the sub-pixel G, the sub-pixel B and the sub-pixel W2 are, for example, a red sub-pixel, a green sub-pixel, a blue sub-pixel and a white sub-pixel, and the sub-pixel W1 is a viewing angle control sub-pixel. When the viewing angle control sub-pixel W1 emits light, the light emission direction thereof is inclined by the guiding of the liquid crystal laterally, and therefore, the user actually cannot view the light emitted by the viewing angle control sub-pixel W1 from the front side of the display device 100. The green sub-pixel G and the red sub-pixel R are configured adjacent to each other, the blue sub-pixel B and the green sub-pixel G are configured adjacent to each other, and the white sub-pixel W and the blue sub-pixel B are configured adjacent to each other.

Figure 2:
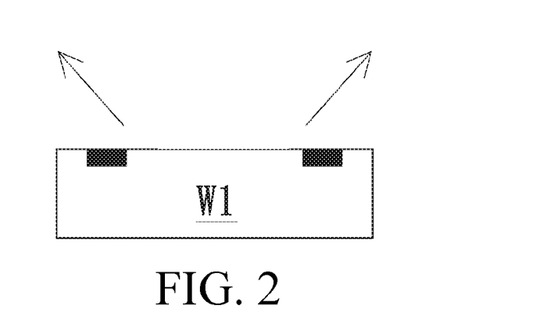
FIG. 2 is a schematic diagram of a light emission direction of a sub-pixel according to an embodiment of the present invention.

The viewing angle control sub-pixel W1 is configured to be enabled under a narrow viewing angle mode and to be disabled under a wide viewing angle mode. When the viewing angle control sub-pixel W1 is enabled to emit light, the light emission direction thereof is inclined by the guiding of the liquid crystal laterally instead of in a forward direction at an included angle between 0 degree and 90 degrees (as shown in FIG. 2), and therefore, the visibility of the red sub-pixel R, the green sub-pixel G, the blue sub-pixel B and the white sub-pixel W2 is interfered at the lateral side of the display device 100 so that the viewing angles thereof are smaller, and the viewing angles thereof are larger when the viewing angle control sub-pixel W1 is disabled and does not emit light, thereby achieving the effect of privacy filtering.

In addition, as shown in FIG. 1, in this embodiment, the first pixel 101 and the second pixel 102 are located on the same column are disposed alternatively, the first pixel 101 and the second pixel 102 located on the same row are also disposed alternatively, and therefore, the viewing angle control sub-pixels W1 are configured in a checkerboard like manner in the display device 100. In this configuration, when a plurality of viewing angle control sub-pixels W1 is enabled under the narrow viewing angle mode, the degree of irregularity of the lateral light emission is increased, and the lateral visibility of the red sub-pixel R, the green sub-pixel G, the blue sub-pixel B and the white sub-pixel W2 of the overall display device 100 is lower, thereby reaching a better privacy filtering effect.

Figure 3:
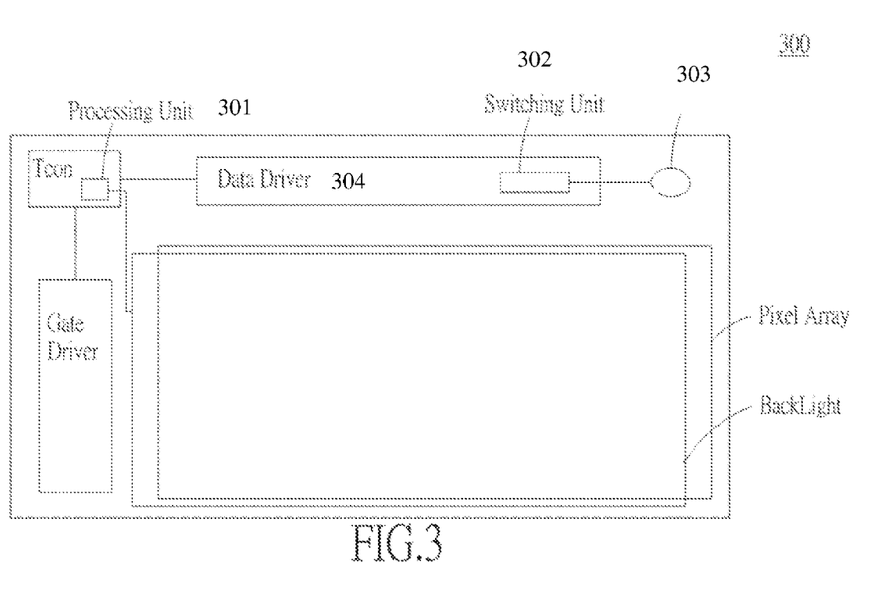
FIG. 3 is a detail s schematic diagram of a display device with switchable viewing angle according to an embodiment of the present invention.

FIG. 3 is a detail schematic diagram of a display device, the display device 300 further includes a detection circuit 303 and a switching circuit 302, and the detection circuit is configured to detect a primary target and a secondary target. For example, the detection circuit 303 mainly detects, for example, a human face of a primary user (the primary target), and may further detect a human face (the secondary target) beside the primary user in a detection range. When the detection circuit 303 detects the primary target but does not detect the secondary target, a first control signal is output to the switching circuit 302 to control the display device 300 to execute in the wide viewing angle mode, and when the detection circuit 303 detects existence of the secondary target and the primary target, a second control signal is output to the switching circuit 302 to control the display device 300 to execute in the narrow viewing angle mode. In this embodiment, the detection circuit 303 may be, for example, a graphics detector configured to detect face shapes of the primary user and the secondary user; however, the present invention is not limited thereto, and persons skilled in the art may use different detectors to detect the primary target and the secondary target according to different requirements; in spite of this, similar technical measures are all fall within the protection scope of the present invention.

In the display device 100 shown in FIG. 1, the length-width ratio of each of the red sub-pixel R, the green sub-pixel G and the blue sub-pixel B is 2:1, and the area of each of the red sub-pixel R, the green sub-pixel G and the blue sub-pixel B is n times that of the white sub-pixel W2, and n is a positive number. In this embodiment, illustration is made by using n=2 as an example, but the present invention is not limited thereto. As shown in FIG. 3, the display device 300 further comprises a processing unit 301, and the processing unit 301 is configured to determine the backlight brightness of the display device 300 according to a dynamically adjustable color gamut threshold, the color gamut threshold ranges from 0 to 1, and each color gamut threshold has corresponding backlight brightness. When the color gamut threshold is 1, the processing unit 301 controls the backlight brightness to be full open. The display device 300 further includes a data driver 304, configured to provide display data required by the red pixel R, the green pixel G and the blue pixel B.

It should be noted that, in this embodiment, the white light emitted by the white sub-pixel W2 is used to improve the brightness of the red sub-pixel R, the green sub-pixel G and the blue sub-pixel B, thereby compensating the aperture ratio of the display device 100 in the narrow viewing angle mode. The processing unit 301 extracts, according to the display data received by the red sub-pixel R, the green sub-pixel G and the blue sub-pixel B, display data to be output by the white sub-pixel W2. Specifically, the processing unit 301 first converts the display data of the red sub-pixel R, the green sub-pixel G and the blue sub-pixel B from a signal domain into a brightness domain, in other words, the processing unit 301 converts a gray-scale value of display data of each sub-pixel into a brightness value, and therefore, the gray-scale value of the display data of each sub-pixel can correctly match with the backlight brightness of the display device 300. A corresponding mapping value may be obtained by taking a reciprocal number of the backlight brightness, and the so-called mapping value will be described in the following.

Figure 4:
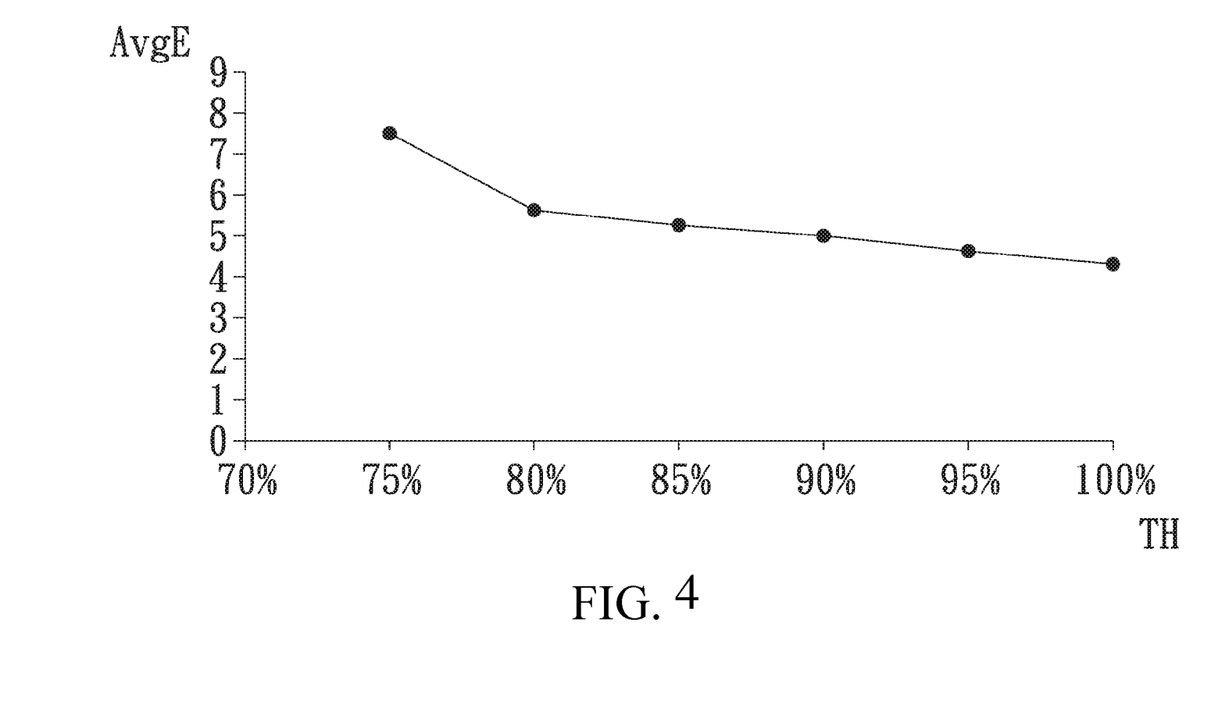
FIG. 4 is a curve graph of a color gamut threshold and a picture average chromatic aberration.

In view of the above, after the display data is converted from the signal domain to the brightness domain, the backlight brightness of the display device 300 is determined according to the color gamut threshold. For example, when it is determined that the color gamut threshold is 100%, the corresponding backlight brightness is 1, and in other words, in a case that the backlight brightness is full open or set to its maximum brightness, the color displayed by each sub-pixel is in a normal color gamut range thereof. If it is determined that the color gamut threshold is 80%, the processing unit 301 will calculate the corresponding backlight brightness, for example, 0.85, thereby achieving the effect of saving power by reducing the backlight brightness. However, for example, when the color gamut threshold is 80%, it indicates that 20% of color information displayed by each sub-pixel exceeds the normal color gamut range. In a preferred situation, the color difference generated when the range of the color gamut threshold substantially falls between 80% and 100% is not obvious for human eyes, as shown in FIG. 4. In FIG. 4, the horizontal axis indicates the color gamut threshold TH, the vertical axis indicates the picture average chromatic aberration AvgE, and it can be seen from FIG. 4 that, when the color gamut threshold is lower than 80%, a value of the picture average chromatic aberration AvgE is increased significantly.

In view of the above, before extracting the display data of the white sub-pixel W2 from the display data of the red sub-pixel R, the green sub-pixel G and the blue sub-pixel B, the display information of the red sub-pixel R, the green sub-pixel G and the blue sub-pixel may be subjected to signal amplification, that is, an original signal amount thereof is multiplied by the mapping value. The processing unit 301 is configured to extract the display data having the minimum brightness in the display data received by the red sub-pixel R, the green sub-pixel G and the blue sub-pixel B, multiplies the display data having the minimum brightness by the mapping value, so as to extract the display data to be output by the white sub-pixel W2, where the mapping value is inversely proportional to the backlight brightness. For example, assuming that the mapping value is a, the signal amount of the white sub-pixel W2 in the brightness domain will be the minimum one after the signal amount of the red sub-pixel R, the signal amount of the green sub-pixel G and the signal amount of the blue sub-pixel B are respectively multiplied by a, and may be expressed by a mathematic expression: $W = a \times [RGB]_{min}$; W indicates the signal amount of the white sub-pixel W2 in the brightness domain, a indicates the mapping value, and $[RGB]_{min}$ indicates the minimum one among the signal amount of the red sub-pixel R, the signal amount of the green sub-pixel G, and the signal amount of the blue sub-pixel B.

When the display device 300 is operated in the wide viewing angle mode, the processing unit 301 is further configured to multiply the display data respectively received by the red sub-pixel R, the green sub-pixel G and the blue sub-pixel B by the mapping value and then subtract a correction value from the product, and accordingly determines the display data to be output by the red sub-pixel R, the green sub-pixel G and the blue sub-pixel B. The correction value is obtained by dividing the display data to be output by the white sub-pixel W2 by n. In the foregoing description, n is, for example, 2, and therefore, the display information to be output by the red sub-pixel R, the green sub-pixel G and the blue sub-pixel B after being converted from the signal domain to the brightness domain may be expressed by a mathematic expression: $Cout = a \times Cin - (W/2)$; Cout indicates signal amount to be output by the red sub-pixel R, the green sub-pixel G or the blue sub-pixel B in the brightness domain, a indicates the mapping value, Cin indicates signal amount received by the red sub-pixel R, the green sub-pixel G or the blue sub-pixel B in the brightness domain, and W indicates signal amount of the white sub-pixel W2 in the brightness domain.

In view of the above, after the signal amounts of the red sub-pixel R, the green sub-pixel G, the blue sub-pixel B and the white sub-pixel W2 in the brightness domain are all determined, the signal amounts in the brightness domain are converted into gray-scale signals in the signal domain and the gray-scale signals are then output. In this way, when the display device 300 is operated in the wide viewing angle mode, the viewing angle control sub-pixel W1 is disabled and cannot emit light, and therefore, it will not affect viewing angles of other sub-pixels. Moreover, the signal amount required by the white sub-pixel W2 is extracted by amplifying the signal amounts of the red sub-pixel R, the green sub-pixel G and the blue sub-pixel B, and therefore, the white light emitted by the white sub-pixel W2 can improve the brightness of the display device 300 to keep the aperture ratio. Further, the correction value related to the white light emitted by the sub-pixel W2 may be subtracted from the product obtained by multiplying the display data received by the red sub-pixel R, the green sub-pixel G and the blue sub-pixel B by the mapping value, and therefore, the white light emitted by the white sub-pixel W2 may be prevented from affecting the image quality.

On the other hand, when the display device 300 is operated in the narrow viewing angle mode, the viewing angle control sub-pixel W1 is enabled to emit light, and the emitted light is guided by the liquid crystal, so that the light emission amount perpendicular to the surface of the display device 300 may be substantially be omitted, and light is mainly emitted from the lateral side of the surface of the display device 300. In other words, an included angle between the light emission direction and the surface of the display device 300 is between 0 degree and 90 degrees (as shown in FIG. 2), so as to interfere display information viewed by secondary users at both sides of the display device 300. During an actual application, in order for the primary user at the front side of the display device 300 to have a good viewing experience when the viewing angle control sub-pixel W1 emits light, under the narrow viewing angle mode, the processing unit will control the backlight brightness as full open or to be at maximum brightness, and in this case, the mapping value is 1, and moreover, the correction value does not need to be subtracted from the picture information to be output by the red sub-pixel R, the green sub-pixel G and the blue sub-pixel B.

In other words, in the narrow viewing angle mode, in order to maintain the image brightness when the display device 300 is viewed from the front side, the information amount of the display information received by the red sub-pixel R, the green sub-pixel G and the blue sub-pixel B is the information amount to be output, and the backlight brightness is maintained in the full open state. Moreover, under the narrow viewing angle mode, the signal amount of the white sub-pixel W2 may be expressed by a mathematic expression: $W = [RGB]_{min}/n$. In this embodiment, the area of each of the red sub-pixel R, the green sub-pixel G and the blue sub-pixel B is twice the area of the white sub-pixel W2, and therefore, n=2. In other words, the area of the sub-pixel W2 is a half of the area of each of the red sub-pixel R, the green sub-pixel G and the blue sub-pixel B, and therefore, the required brightness is generally half, thereby avoiding that the white light emitted by the white sub-pixel W2 is too bright to affect the quality of the picture. In this embodiment, the light emission brightness of the viewing angle control sub-pixel W1 is adjustable. It should be specifically noted that, in this embodiment, the light emission direction of the viewing angle control sub-pixel W1 is guided to the lateral side; however, the present invention is not limited thereto, and the same efficacy may be achieved by using elements such as an optical lens.

Figure 5:
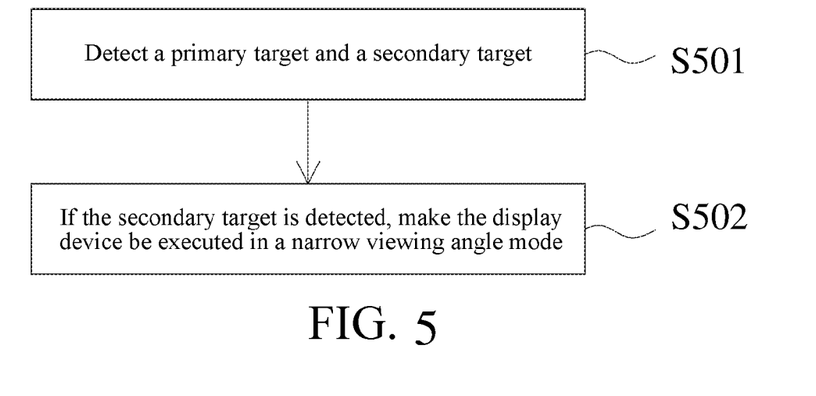
FIG. 5 is a flow chart of operating a display device with switchable viewing angle according to an embodiment of the present invention.

FIG. 5 is a flow chart of an operation method of a display device with switchable viewing angle according to an embodiment of the present invention. After the features are summarized, the operation method shown in FIG. 5 may be obtained, which includes steps S501 to S502. Step S501: Detect a primary target and a secondary target. Step S502: If the secondary target is detected, make the display device to be executed under a narrow viewing angle mode.

It should be specifically noted that, in the display device 300 with a switchable viewing angle of the present invention, a first pixel 101 merely includes a red sub-pixel R and a green sub-pixel G, and therefore, during data displaying, a sub-pixel rendering (SPR) technology may be used to compensate lacking color information (for example, it is lacking color information for blue). Likewise, a second pixel 102 may also perform compensation on lacking color information by using the same method. The present invention mainly reaches the objective of privacy filtering of viewing angle switching by using configuration of the pixel structure and the corresponding operation method, and the technical measures related to the sub-pixel rendering technology are not repeated herein.

Figure 6:
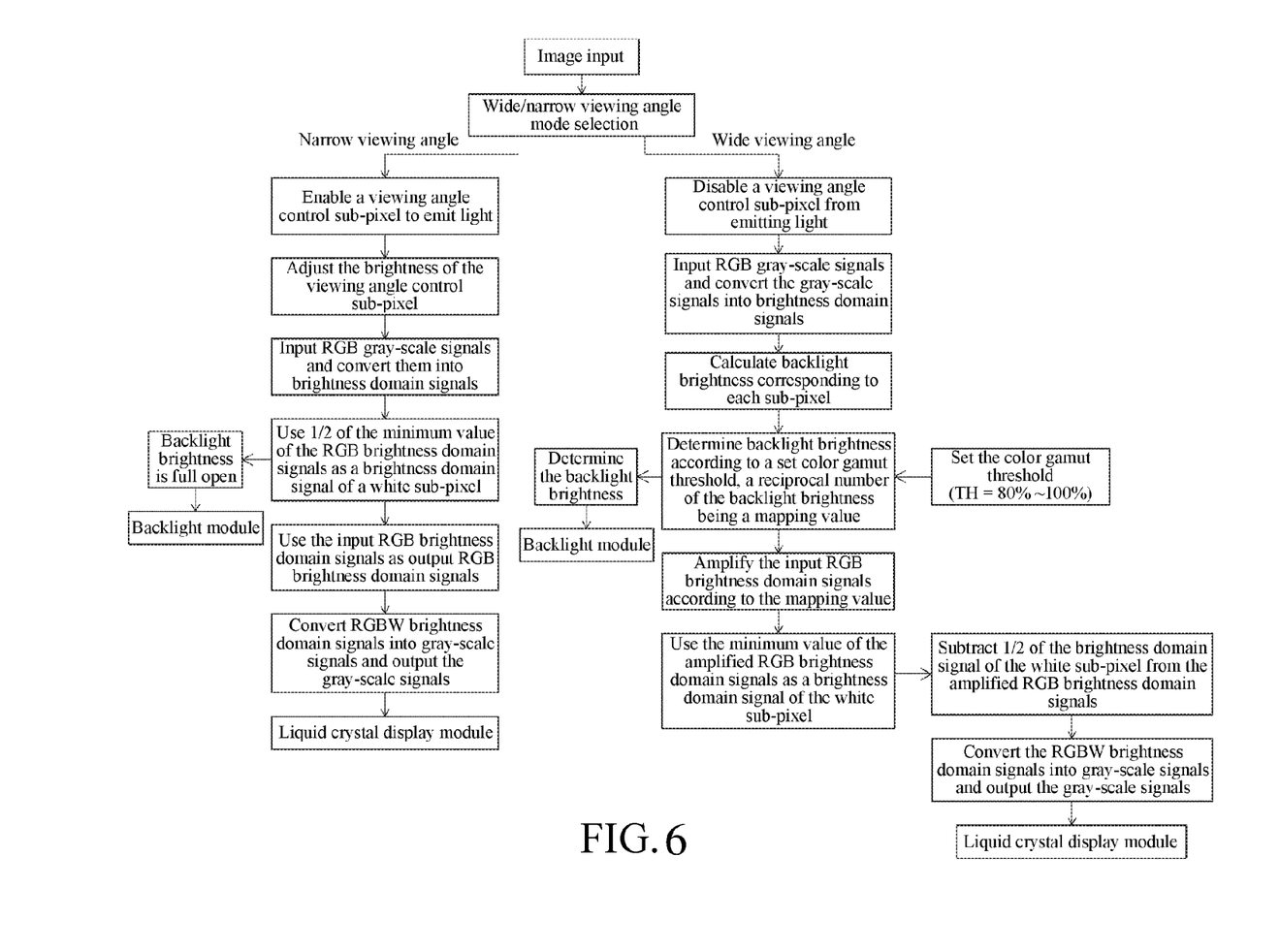
FIG. 6 is a flow chart of operating a display device with switchable viewing angle according to another embodiment of the present invention.

FIG. 6 is a flow chart of an operation method of a display device with switchable viewing angle according to another embodiment of the present invention. FIG. 6 shows a flow chart of a more detailed operation method of the present invention, content of each step may be obtained through summarizing from the above embodiment, and will not be repeated herein.

In view of the above, the display device 300 provided in the present invention achieves the privacy filtering effect by using the configuration of the pixel and the corresponding operation method and compensates the aperture ratio of the display device in the privacy filtering mode. The viewing angle control sub-pixel is used to reduce the visibility of the display device when being viewed from the lateral side to achieve the effect of privacy filtering, and moreover, the white sub-pixel is used to maintain the aperture ratio of the display device.

Additionally, the present invention may further control the backlight brightness of the display device under the wide viewing angle mode by adjusting the color gamut threshold, which, on one hand, achieves the effect of power saving. On the other hand, the mapping value may be obtained by taking a reciprocal number of the mapping value, the RGB signal is converted from the signal domain to the brightness domain, and is then multiplied by the mapping value to perform signal amplification; then the minimum of the amplified RGB signals is used as the brightness domain signal of the white sub-pixel, the brightness domain signal of the white sub-pixel is divided by n to obtain the correction value, and after the correction value is subtracted from the signal obtained after the brightness domain amplification of the RGB signal, the signal amount to be output by the RGB in the brightness domain may be obtained, where n indicates an area multiple of the RGB pixel relative to the white sub-pixel.

Under the narrow viewing angle mode, the backlight brightness is maintained to be full open or at maximum brightness, and therefore, the mapping value is 1, the input signal amount of the RGB in the brightness domain is the output signal amount, and it is unnecessary to subtract the correction value, and the signal amount to be output by the white sub-pixel in the brightness domain is obtained by dividing the minimum one of the signal amount of the RGB in the brightness domain by n. By means of the pixel structure and the operation method described in the present invention, not only the privacy filtering effect can be achieved under the narrow viewing angle mode, but also the aperture ratio can be maintained under the wide viewing angle mode.

The present invention has been disclosed in the foregoing through preferred embodiments, but the embodiments are not intended to limit the present invention, and any person skilled in the art can make some modifications and improvements without departing from the spirit and scope of the present invention; therefore, the protection scope of the present invention should subject to those defined in the accompanying claims.

What is claimed is:

1. A display device with switchable viewing angle, comprising:
    a first pixel, comprising:
        a first sub-pixel; and
        a second sub-pixel;
    a second pixel, disposed to be adjacent to the first pixel, comprising:
        a third sub-pixel;
        a fourth sub-pixel; and
        a fifth sub-pixel, having a light emission direction less than 90 degrees from a surface of said display device; and
    a detection circuit, for detecting a primary target and a secondary target;
    wherein, when operating in a first viewing angle mode, the fifth sub-pixel is configured to be enabled, and the display device displays in a first viewing angle;
    wherein, when operating in a second viewing angle mode, the fifth sub-pixel is configured to be disabled, and the display device displays in a second viewing angle;
    wherein the display device is set to be operated in the first viewing angle mode from the second viewing angle mode when said secondary target is detected, and the display device is set to be operated in the second viewing angle mode, and disabling the fifth sub-pixel when only said primary target is detected;
    wherein, said first viewing angle is narrower than said second viewing angle, and the fifth sub-pixel has a light emission direction less than 90 degrees from the surface of said display device; and
    wherein a primary display data is provided to the first sub-pixel, the second sub-pixel, and the third sub-pixel, and a secondary display data is provided to the fourth sub-pixel according to the primary display data.

2. The display device according to claim 1, further comprising:
    a switching circuit, for receiving a first control signal to switch the display device to operate in the first angle viewing mode, and for receiving a second control signal to switch the display device to operate in the second viewing angle mode;
    wherein, when the detection circuit detects only the primary target, the detection circuit outputs the second control signal to the switching circuit;
    and when the detection circuit detects the secondary target, the detection circuit outputs the first control signal to the switching circuit.

3. The display device according to claim 1, further comprising a plurality of the first pixels and a plurality of the second pixels in a first column, wherein each of the first pixels and each of the second pixels are configured alternatively.

4. The display device according to claim 1, wherein, a length-width ratio for the first sub-pixel, the second sub-pixel, and the third sub-pixel is 2:1, each of the first sub-pixel, the second sub-pixel and the third sub-pixel is n times larger than the fourth sub-pixel, and n is a positive number.

5. The display device according to claim 4, further comprising a processing unit, wherein the processing unit determines a backlight brightness of the display device according to a dynamically adjustable color gamut threshold, a color gamut threshold ranges from 0 to 1, and the processing unit controls the backlight brightness to be full open when the color gamut threshold is 1.

6. The display device according to claim 5, further comprising a display data providing unit, configured to provide a display data required by the first sub-pixel, the second sub-pixel and the third sub-pixel.

7. The display device according to claim 6, wherein said processing unit extracts a secondary display data to be displayed by the fourth sub-pixel according to the primary display data received by the first sub-pixel, the second sub-pixel, and the third sub-pixel.

8. The display device according to claim 7, wherein, the processing unit extracts the a minimum brightness display data from the primary display data, multiply the minimum brightness data by a mapping value for extracting the secondary display data, and the mapping value is inversely proportional to the backlight brightness.

9. The display device according to claim 8, wherein, when operating in the second viewing angle mode, the processing unit respectively multiplies the primary display data by the mapping value to form a product, then subtract a correction value from the products to get a value, and determines an adjusted primary display data to be output to the first sub-pixel based on the value, the second sub-pixel, and the third sub-pixel, wherein the correction value is obtained from dividing said secondary display data to be output to the fourth sub-pixel by n.

10. The display device according to claim 8, when operating in the first viewing angle mode, the mapping value is 1, the processing unit extracts the minimum brightness display data from the primary display data, and divides said minimum brightness display data by n to extract said secondary display data to be out put to the fourth pixel.

11. The display device according to claim 10, wherein, when operating in the first viewing angle mode, the primary display data is equal to the secondary display data.

12. An operation method of a display device with switchable viewing angle, the display device comprises a first pixel and a second pixel, said first pixel having a first sub-pixel and a second sub-pixel, said second pixel having a third sub-pixel, a fourth sub-pixel, and a fifth sub-pixel, the operation method comprising:
  detecting a primary target and a secondary target;
  setting the display device to be operated in the first viewing angle mode from a second viewing angle mode when said secondary target is detected; and
  setting the display device to be operated in the second viewing angle mode, and disabling the fifth sub-pixel when only the primary target is detected;
  wherein, when operating in the first viewing angle mode, the fifth sub-pixel is enabled and the display device displays in a first viewing angle;
  wherein, when operating in the second viewing angle mode, the fifth sub-pixel is disabled, and the display device displays in a second viewing angle;
  wherein, the first viewing angle is narrower than the second viewing angle, and the fifth sub-pixel has a light emission direction less than 90 degrees from a surface of said display device; and
  wherein a primary display data is provided to the first sub-pixel, the second sub-pixel, and the third sub-pixel, and a secondary display data is provided to the fourth sub-pixel according to the primary display data.

13. The operation method according to claim 12, further comprising:
  determining backlight brightness of said display device when operating in said second viewing angle mode, wherein said backlight brightness is determined according to a dynamically adjustable color gamut threshold, and a minimum brightness display data in said primary display data is extracted to be multiplied by a mapping value for providing said secondary display data, and said mapping value being inversely proportional to said backlight brightness.

14. The operation method according to claim 13, further comprising when operating in said second viewing angle mode, multiplying said primary display data by said mapping value to form products, subtracting a correction value from the products, and outputting subtracted products to said first sub-pixel, said second sub-pixel, and said third sub-pixel, wherein the correction value is obtained by dividing the secondary display data by n.

15. The operation method according to claim 13, wherein the color gamut threshold ranges from 0 to 1, the color gamut threshold corresponds to the backlight brightness, and when the color gamut threshold is 1, said backlight brightness is to be full open.

16. The operation method according to claim 12, wherein, when operating in the first viewing angle mode, extracting a minimum brightness display data in the primary display data, and producing the secondary display data by dividing the minimum brightness display data by n.

17. The operation method according to claim 16, wherein when operating in the first viewing angle mode, the primary display data is equal to the secondary display data.

18. The operation method according to claim 17, wherein when the fifth sub-pixel is disabled, the fifth sub-pixel emits single-color light, and a display brightness of said single-color light is adjustable.

* * * * *